United States Patent
Gauf et al.

(10) Patent No.: US 12,360,884 B2
(45) Date of Patent: Jul. 15, 2025

(54) EDGE ANALYTICS FOR PREDICTING SOFTWARE FAILURES

(71) Applicant: Innovative Defense Technologies, LLC, Arlington, VA (US)

(72) Inventors: Bernard Gauf, Vienna, VA (US); Apostolos Topalis, Mullica Hill, NJ (US); Keith Harriman, Newtown, PA (US)

(73) Assignee: Innovative Defense Technologies, LLC, Arlington, VA (US)

( * ) Notice: Subject to any disclaimer, the term of this patent is extended or adjusted under 35 U.S.C. 154(b) by 130 days.

(21) Appl. No.: 18/063,251

(22) Filed: Dec. 8, 2022

(65) Prior Publication Data

US 2023/0185704 A1 Jun. 15, 2023

Related U.S. Application Data

(60) Provisional application No. 63/287,842, filed on Dec. 9, 2021.

(51) Int. Cl.
G06F 11/3668 (2025.01)
G06N 20/00 (2019.01)

(52) U.S. Cl.
CPC ...... *G06F 11/3688* (2013.01); *G06F 11/3692* (2013.01); *G06N 20/00* (2019.01)

(58) Field of Classification Search
CPC .. G06F 11/3688; G06F 11/3692; G06N 20/00
See application file for complete search history.

(56) References Cited

U.S. PATENT DOCUMENTS

| | | | |
|---|---|---|---|
| 8,826,084 B1 | 9/2014 | Gauf et al. | |
| 9,122,803 B1* | 9/2015 | Michelsen | G06F 11/3684 |
| 9,135,714 B1 | 9/2015 | Gauf et al. | |
| 9,983,965 B1 | 5/2018 | Gauf et al. | |
| 10,678,666 B1 | 6/2020 | Gauf et al. | |
| 2013/0152047 A1* | 6/2013 | Moorthi | G06F 11/3664 |
| | | | 717/124 |
| 2014/0157036 A1* | 6/2014 | Walton | G06F 11/0706 |
| | | | 714/39 |
| 2019/0102244 A1* | 4/2019 | Tarlano | G06F 11/0787 |
| 2021/0042644 A1* | 2/2021 | Blanton | G06N 20/20 |
| 2021/0109843 A1* | 4/2021 | Datta | G06F 9/54 |
| 2021/0157665 A1* | 5/2021 | Rallapalli | G06F 11/3068 |
| 2022/0147413 A1* | 5/2022 | McHugh | G06F 11/0793 |

(Continued)

OTHER PUBLICATIONS

Ullah, Najeeb. "A method for predicting open source software residual defects." Software Quality Journal 23 (2015): 55-76. (Year: 2015).*

(Continued)

*Primary Examiner* — Evral E Bodden
*Assistant Examiner* — Joanne G Macasiano
(74) *Attorney, Agent, or Firm* — Hunton Andrews Kurth LLP

(57) ABSTRACT

An embodiment of the present invention is directed to a novel approach of predicting software failures while executing in an operational or production environment. The innovative method and system provides analytic capabilities that monitor a system and input conditions and further provides a prediction mechanism to anticipate a software failure and present an improved course of action.

20 Claims, 5 Drawing Sheets

(56) References Cited

U.S. PATENT DOCUMENTS

2022/0283919 A1    9/2022  Gauf et al.
2023/0315939 A1*  10/2023  Ramanath ........... G06F 11/3684
                                                      703/22

OTHER PUBLICATIONS

Lo, David, et al. "Classification of software behaviors for failure detection: a discriminative pattern mining approach." Proceedings of the 15th ACM SIGKDD international conference on Knowledge discovery and data mining. 2009. (Year: 2009).*

Shen, Qing, et al. "Failure prediction by regularized fuzzy learning with intelligent parameters selection." Applied Soft Computing 100. Mar. 2021: 106952. (Year: 2021).*

\* cited by examiner

EDGE ANALYTICS FOR PREDICTING SOFTWARE FAILURES

CROSS REFERENCE TO RELATED APPLICATIONS

This application claims priority to U.S. Provisional Application No. 63/287,842, filed Dec. 9, 2021, the contents of which are incorporated by reference herein in their entirety.

This application relates to U.S. Pat. No. 8,826,084 (entitled "Method and System for Implementing Automated Test and Retest Procedures"), U.S. Pat. No. 9,135,714 (entitled "Method and System for Integrating a Graphical User Interface Capture for Automated Test and Retest Procedures"), U.S. Pat. No. 9,983,965 (entitled "Method and System for Implementing Virtual Users for Automated Test and Retest Procedures") and U.S. Pat. No. 10,678,666 (entitled "Method and System for Implementing Automated Test and Retest Procedures in a Virtual Test Environment"), the contents of which are incorporated by reference herein in their entirety.

This application also relates to U.S. patent application Ser. No. 17/683,672 (entitled "Automated Testing Methods for Condition Analysis and Exploration"), filed Mar. 1, 2022, which claims priority to U.S. Provisional Application No. 63/155,457, filed Mar. 2, 2021, the contents of which are incorporated by reference herein in their entirety.

FIELD OF THE INVENTION

The present invention relates generally to software failure predictions and more specifically to a method and system for implementing edge analytics for predicting software failures.

BACKGROUND OF THE INVENTION

The complex systems under test that operate in real-world environments can be presented with an infinite number of input conditions during execution. In many cases, this input condition space cannot be adequately sampled and tested due to the finite resources and limited time available for testing.

Once a system has been released and deployed in an operational environment or "on the edge", the infinite condition space can continue to be explored. As a consequence, it is likely that specific input combinations presented to the system have never been tested. Behavior of the system in this untested condition space is unknown and can lead to the failure of the software system. A software failure in this case can include any situation when an expected result does not match the actual result due to a developer error, a design flaw in the system and/or insufficient system requirements. Furthermore, some software failures are not necessarily apparent to the system operators while others can be catastrophic and require operator intervention.

These and other drawbacks exist.

SUMMARY OF THE INVENTION

According to an embodiment of the present invention, a computer implemented system implements edge analytics to predict software failures. The system comprises: a memory component; and a computer server executing in an operational environment and coupled to the memory component, the computer server comprising a computer processor configured to perform the steps of: monitoring the computer server during an operational execution; executing a prediction mechanism to anticipate a software failure wherein the prediction mechanism operates: a first phase that captures one or more failure patterns wherein the one or more failure patterns are sourced from a corresponding simulated environment and that collects operational edge analytics data across multiple deployed instances during the operational execution in the operational environment; and a second phase that applies the one or more failure patterns in the operational environment to identify one or more input conditions and analysis results of one or more software failures to produce a dataset and identify correlations between the one or more input conditions and the one or more software failures through statistical analysis; responsive to the prediction mechanism, generating a decision boundary that provides a baseline to avoid the one or more software failures; and responsive to the anticipated software failure, generating at least one recommended course of action.

According to an embodiment of the present invention, a computer implemented method implements edge analytics to predict software failures. The method comprises the steps of: monitoring a computer server coupled to a memory component during an operational execution; executing a prediction mechanism to anticipate a software failure wherein the prediction mechanism operates: a first phase that captures one or more failure patterns wherein the one or more failure patterns are sourced from a corresponding simulated environment and that collects operational edge analytics data across multiple deployed instances during the operational execution in an operational environment; and a second phase that applies the one or more failure patterns in the operational environment to identify one or more input conditions and analysis results of one or more software failures to produce a dataset and identify correlations between the one or more input conditions and the one or more software failures through statistical analysis; responsive to the prediction mechanism, generating a decision boundary that provides a baseline to avoid the one or more software failures; and responsive to the anticipated software failure, generating at least one recommended course of action.

An embodiment of the present invention is directed to anticipating the behavior of a system when exploring an input condition space in an operational environment. This allows the system or an operator to adapt accordingly thereby minimizing situations where software may fail.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
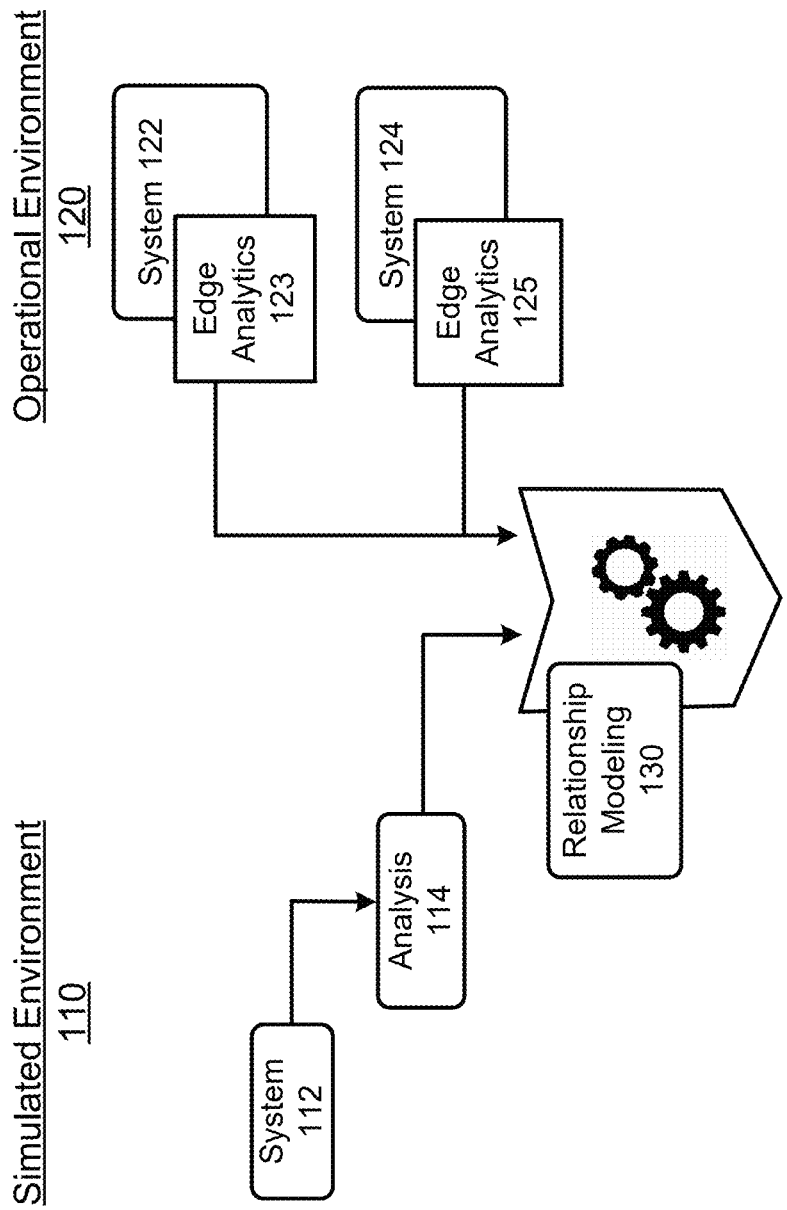
FIG. 1 is an exemplary diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a novel approach for predicting software failures while executing in an operational or production environment. The innovation provides analytic capabilities that monitor a system and input conditions and further provides a prediction mechanism to anticipate a software failure and present an improved course of action. This may further involve automatically implementing or executing the improved course of action. An embodiment of the present invention may also optimize performance, improve resource utilization, achieve system robustness and/or realize other efficiencies based on the prediction mechanism.

According to an embodiment of the present invention, Edge Analytics involves instrumenting a system to capture and process information during operational execution. Systems typically log information during execution to be post-processed or analyzed at a later time. The innovation focuses on an analysis capability that executes in situ for the purpose of predicting software failures. The analysis may be designed to make assessments independent of the input conditions allowing for the evaluation in an untested condition space.

According to an embodiment of the present invention, the ability to predict a software failure may be derived from multiple distinct phases. A first phase may be considered a learning phase where the failure patterns are learned and/or captured. A second phase may exploit these patterns and relationships in an operational environment. During the learning phase, information may be sourced by exercising the system in a simulated environment. For example, information may be sourced by collecting data from a system, data from the system running in an environment and/or analysis results of the collected data. Additionally, an edge analytics capability offers the ability to collect operational data across multiple deployed instances of a system. Operational data may represent data collected from a system running in an operational or deployed environment as opposed to a simulated environment or lab environment. Annotating the generated system data with input conditions and analysis results of software failures produces a dataset that may be mined to find correlations between input conditions and failures. This may be accomplished by a statistical analysis or a Machine Learning (ML) algorithm tasked to learn the target relationship.

Advancements in automated testing and analysis techniques such as Automated Test and Re-Test (ATRT) enable continuous evaluation of complex software providing requirements and performance assessments throughout the development and lifecycle of a system. The embodiments of the present invention may be implemented with various systems including systems that support Automated Test and Re-Test (ATRT), as described in U.S. Pat. Nos. 8,826,084, 9,135,714, 9,983,965 and 10,678,666.

FIG. 1 is an illustration of a learning phase, according to an embodiment of the present invention. As shown in FIG. 1, information may be sourced by simulated and operational environments, represented by 110 and 120, respectively. In Simulated Environment 110, system 112 may generate certain analysis, shown by 114. For example, analysis may represent the transformation of data, an insight derived from collected data, etc. In Operational Environment 120, multiple systems, represented by 122, 123 may generate edge analytics 124, 125, respectively. For example, Systems 122, 124 may operate in an actual system operation. Edge analytics may represent a type of analytics that analyzes data from various components of a system, including logs, instrumentation, sensors, network devices and/or other metrics sampling the environment conditions, etc. The analysis and analytics generated by various environments may be received by Relationship Modeling 130. Edge analytics may provide instances of input conditions and analysis results. In the cases where the analysis results indicate a software failure, data that describes and/or relates to the situation the system was in during that failure may be captured by recording the corresponding conditions. As multiple failure instances are collected, a relationship may be formed between input conditions and software failures. For instance, the relationships between input conditions and software failures may be extremely complex as the number of conditions shown to be related the software behavior increases. The complexity may vary across systems, environments, applications, etc.

Figure 2:
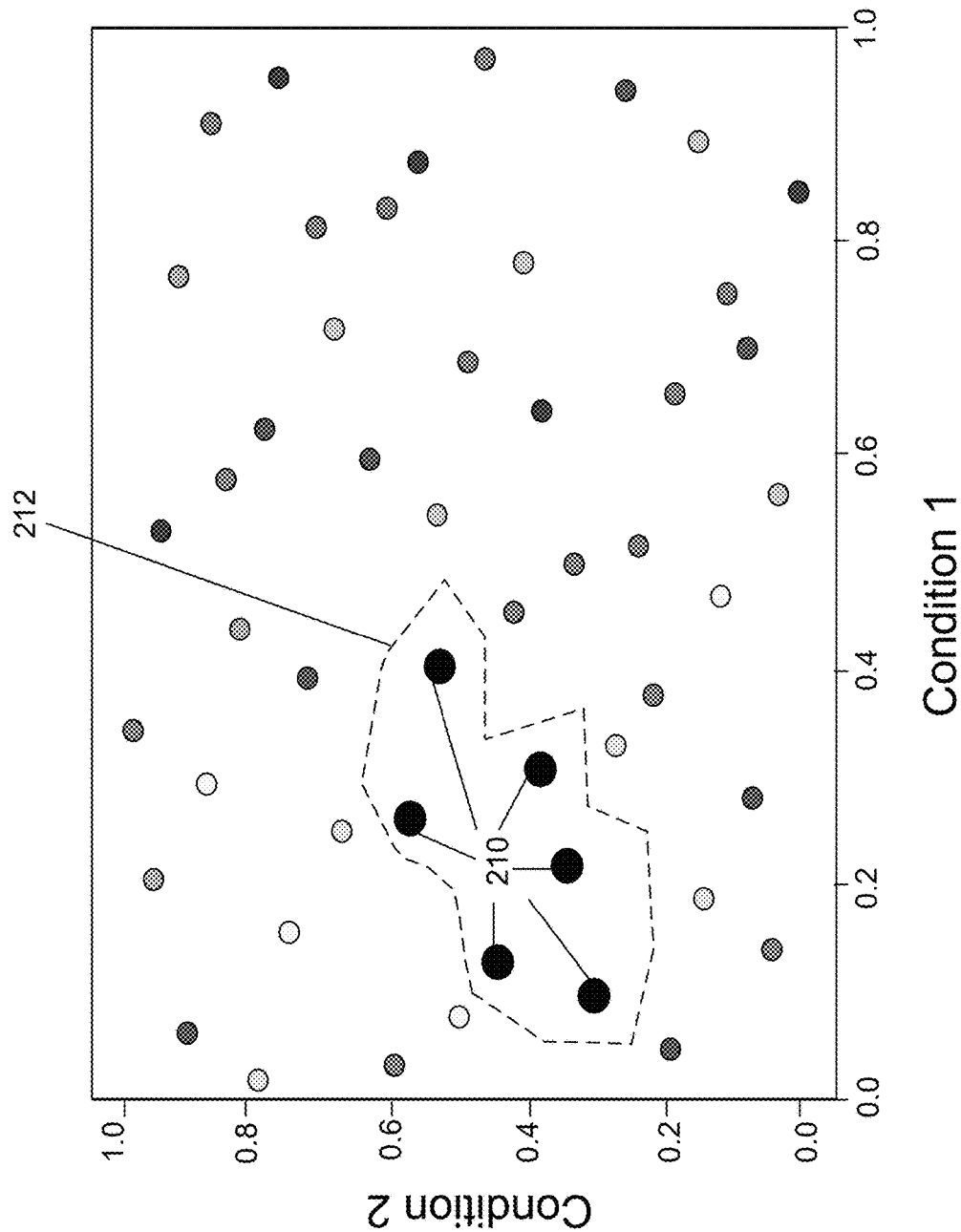
FIG. 2 is an exemplary chart, according to an embodiment of the present invention.

FIG. 2 is an illustration of an exemplary relationship between conditions and failures, according to an embodiment of the present invention. FIG. 2 illustrates the relationship between two conditions and software failures of a system.

As shown by 210, the samples denote tested instances of the condition space that resulted in a software failure. The dashed-line region 212 highlights the learned or identified condition space that has a high likelihood of software failures. This may be captured by a machine learning (ML) model, statistical analysis, etc. The result may then be used as a decision boundary to be exploited in an operation environment. This method may be used in systems to provide a baseline capability. An embodiment of the present invention further leverages this approach to predict and avoid software failures.

An embodiment of the present invention recognizes that there are several ways to exploit the relationships found between input conditions and software failures due to various causes of software failures. As described above, software failures may include any situation when an expected result does not match the actual result due to various errors, including a developer error, a design flaw in the system, insufficient system requirements, etc. Regardless of the cause, an embodiment of the present invention is directed to providing a mechanism within the edge analytics capabilities to adapt the system or recommend an improved course of action (or other response) based on an anticipation of a software failure.

When a system executes in an operational or production environment, the condition space illustrated in FIG. 2 may be traversed in real-time. In other words, the system experiences several instances of condition 1 and condition 2 pairs. Examples of conditions may include but are not limited to: parameters or configurations of the system, a mode that the system is in, a sensor measurement of the environment, (e.g., Altitude, Temperature, Speed, Memory Utilization, etc.), etc. When the input conditions approach the highlighted region, represented by 212, the innovation anticipates a software failure and recommends a new Course of Action (COA) or automatically adapts the system to avoid the region.

Figure 3:
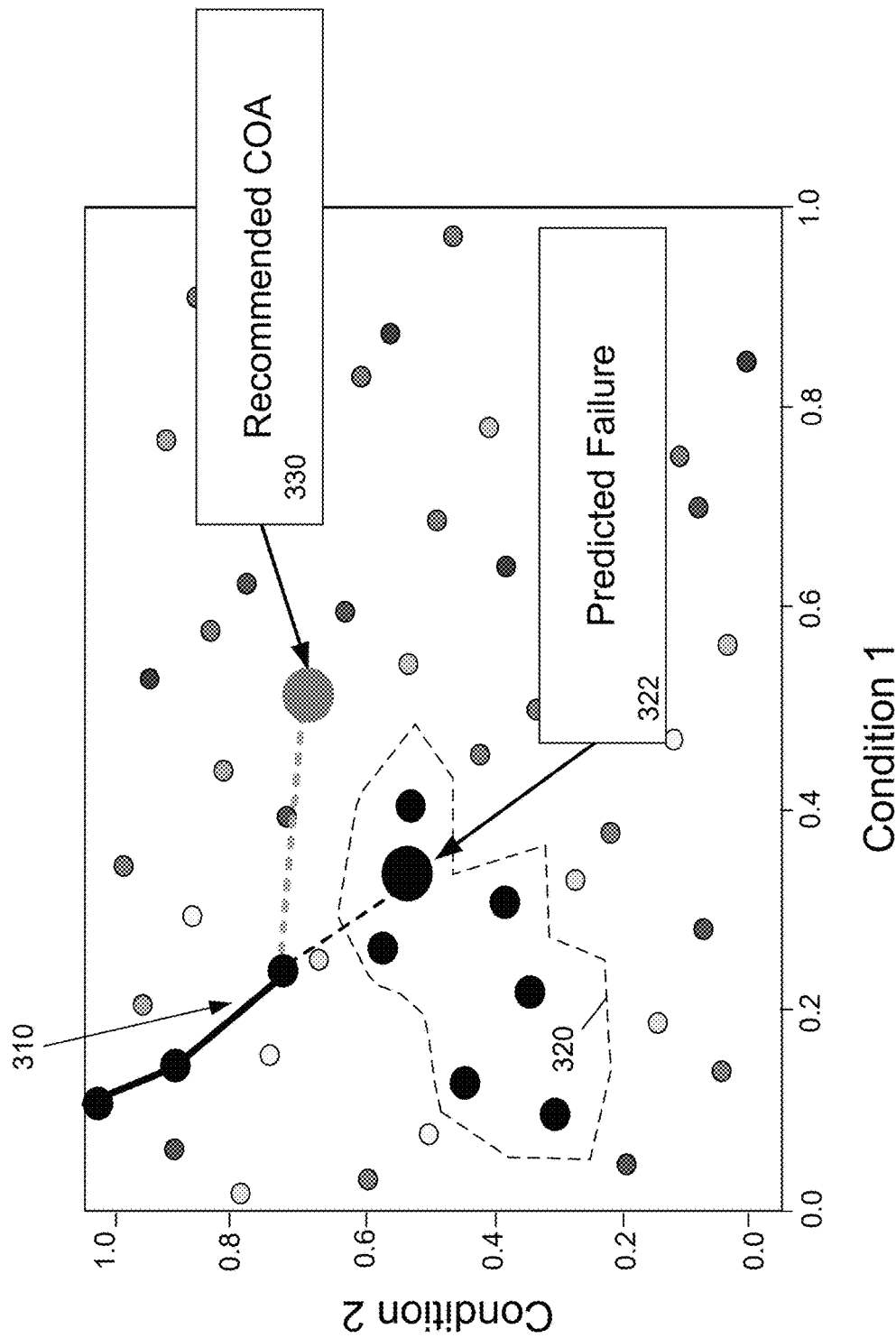
FIG. 3 is an exemplary chart, according to an embodiment of the present invention.

FIG. 3 is an illustration of an exemplary relationship between conditions and failures, according to an embodiment of the present invention. FIG. 3 is an illustration of a system navigating a condition space (as shown by 310), the anticipation of a software failure (as shown by 320) and the recommended improved COA (as shown by 330).

As shown in FIG. 3, an embodiment of the present invention is directed to anticipating a software failure as shown by 322 and presenting a proposed Course of Action (COA) as shown by 330. The Course of Action may include one or more actions such as adapting the system and other recommendations. The Course of Action may be automatically implemented or presented to the user for approval. An embodiment of the present invention may identify an optimal Course of Action as well as multiple Courses of Action that may be further ranked by one or more performance metrics. Other variations for addressing the predicted failure may be implemented.

Since no software system is free of defects and it is impossible to test and address issues within the infinite condition space prior to the release or deployment of a system, an embodiment of the present invention is directed to improving the robustness of a system in an operational environment by incorporating edge analytics for predicting and avoiding software failures. Other system optimizations may be achieved through improved performance, resource utilization, system robustness and/or other efficiencies.

Figure 4:
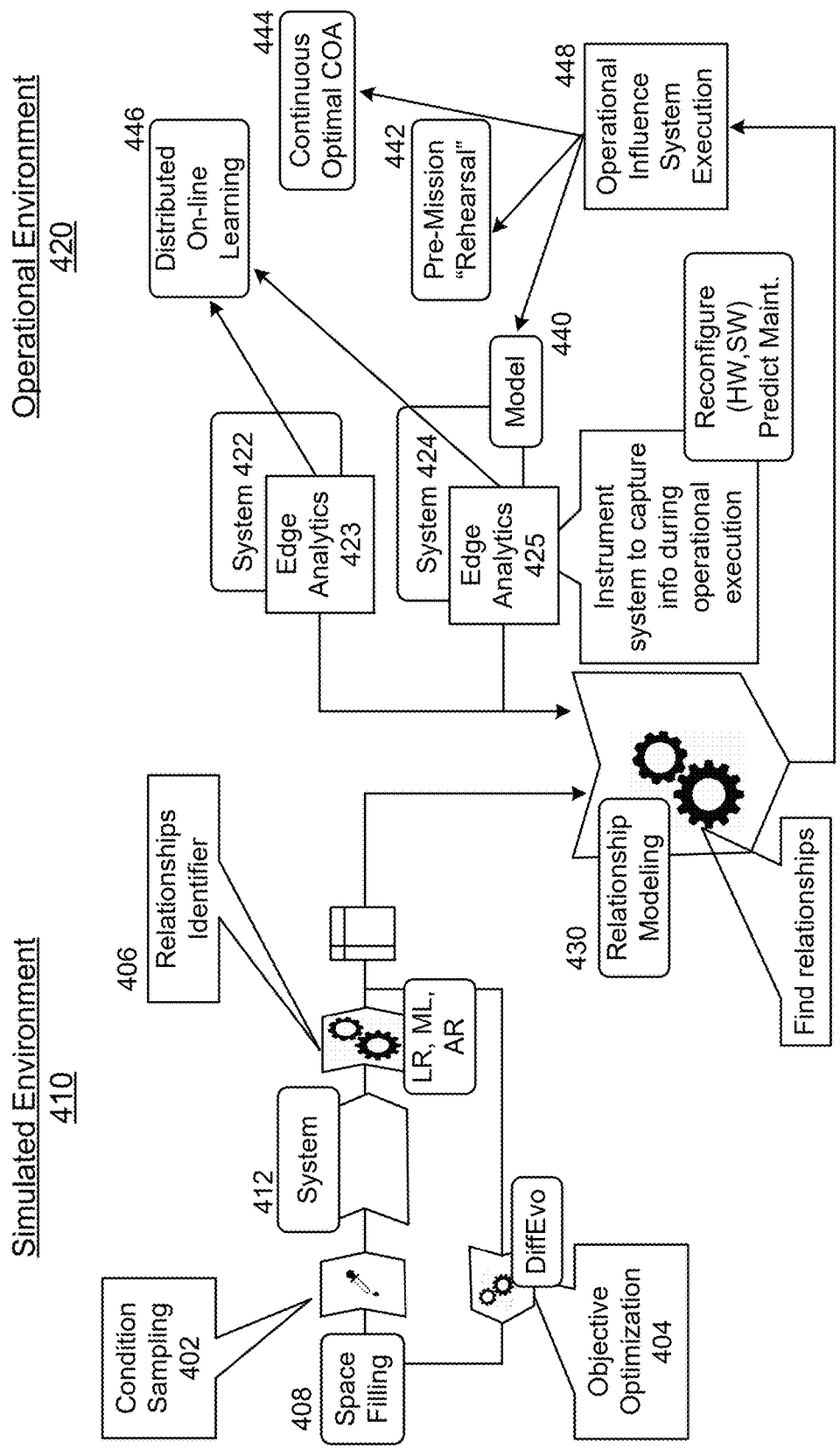
FIG. 4 is an exemplary diagram, according to an embodiment of the present invention.

FIG. 4 is an illustration of a simulated environment and an operational environment, according to an embodiment of the present invention. FIG. 4 is a variation of FIG. 1 above. FIG. 4 illustrates an implementation of edge analytics for predicting software failures. Simulated Environment 410 may include System 412 that generates data for Relationship Modeling 430 which identifies relationships between various conditions. Simulated Environment 410 may further support condition sampling 402, objective optimization 404 and relationships identifier 406 that determines relationships between input conditions and tests results which may then be received by Relationship Modeling 430.

As shown in FIG. 4, Condition Sampling 402 may determine which values to use for a particular run (e.g., execution of the system) from an entire range of possible conditions. With conditions that are continuous (e.g., altitude), the combinations of possible values are infinite. Space Filling 408 may represent a sampling technique that is directed to offering an optimal spread of condition samples. Other sampling techniques may be applied. Objective Optimization 404 may implement an optimization function (e.g., Differential Evolution ("DiffEvo")) to optimize a specific objective. Differential Evolution may represent an evolutionary algorithm that iteratively seeks to improve the candidate solution. An example objective may be to find the combination of input conditions that lead to the maximum number of requirement failures. Relationships Identifier 406 may represent a function that mines data to find relationships between input conditions and test results. Relationships Identifier 406 may apply various algorithms including Logistic Regression ("LR"), Machine Learning ("ML") and Association Rule ("AR"). For example, Logistic Regression (LR) may represent an algorithm that estimates the relationship between a dependent variable and one or more independent variables. Association Rule (AR) learning is a machine learning method for finding interesting relations between variables in large databases in the form of rules. Other types of machine learning (ML) algorithms may be applied.

Operational Environment 420 may include System 422 and 424 and corresponding edge analytics 423 and 425, respectively.

An embodiment of the present invention may find conditions and/or situations associated with system failures or performance. The system may learn "the curve" that represents a conditions-to-system relationship. Once a relationship is found and modeled, it may be exploited in an operational environment by influencing the system execution, through Operational Influence System Execution 448. Examples of operational influence may include: through a Model 440, Pre-Mission Rehearsal 442 and/or continuously monitor for optimal course of action, as shown by Continuous Optimal COA 444.

For example, an inline model, as shown by 440, may serve as a decision aide, such as an Alerting Operator. Pre-mission rehearsal 442 may perform evaluation and avoid predicted software failures. Continuous Optimal COA 444 may find an optimal COA to minimize risk/maximize performance.

Distributed online learning 446 may update local models based on a collective distributed training.

An embodiment of the present invention is directed to performing edge analytics predicting software failures. For example, Edge Analytics, represented by 423, 425, may involve instrumenting a system to capture information during operational execution. Reconfigure (HW, SW) Predictive Maintenance may refer to anticipating a component of HW or SW that requires maintenance or has a high likelihood of failing and then adapting the system to avoid using that component.

In addition, Edge Analytics 423, 425 may transmit analytics data to a Distributed Online Learning module 446. When systems are running in an operational environment and data is being collected and analyzed on the "edge", instances of failures may be collected. The more systems that are running, the more data is being collected in various conditions. Instead of moving the data to a centralized location to find and model the relationships, a distributed on-line learning scheme, as shown by 446, may be implemented to find, model and/or share the relationships across multiple edge analytics instances.

Other features include: data driven analysis, recording events of interest, and operational metrics. An embodiment of the present invention also provides analysis independent of input conditions, indications not reported by an operator and evaluation of untested condition space. An embodiment of the present invention is directed to collecting analysis results across executing systems to find and exploit relationships in the data.

An embodiment of the present invention is directed to performing prediction and further anticipating a software failure, condition and/or other errors. The prediction may be performed at various stages including: prior to deployment of capability; prior to mission execution and during mission execution.

Software failures may include failures that exist in an operational build. This may include failures that are unknown; known, not fixed; design flaws, etc.

An embodiment of the present invention recognizes that various factors may contribute to a software failure including untested conditions, for example.

Actionable outcomes of a software failure prediction may include development cycle influence, such as mission execution, next build, next design iteration, etc.

Benefits of edge analytics may include an ability to adapt on the edge-in real-time. This may support a change in COA, failure situation avoidance and a correct anticipated error.

Figure 5:
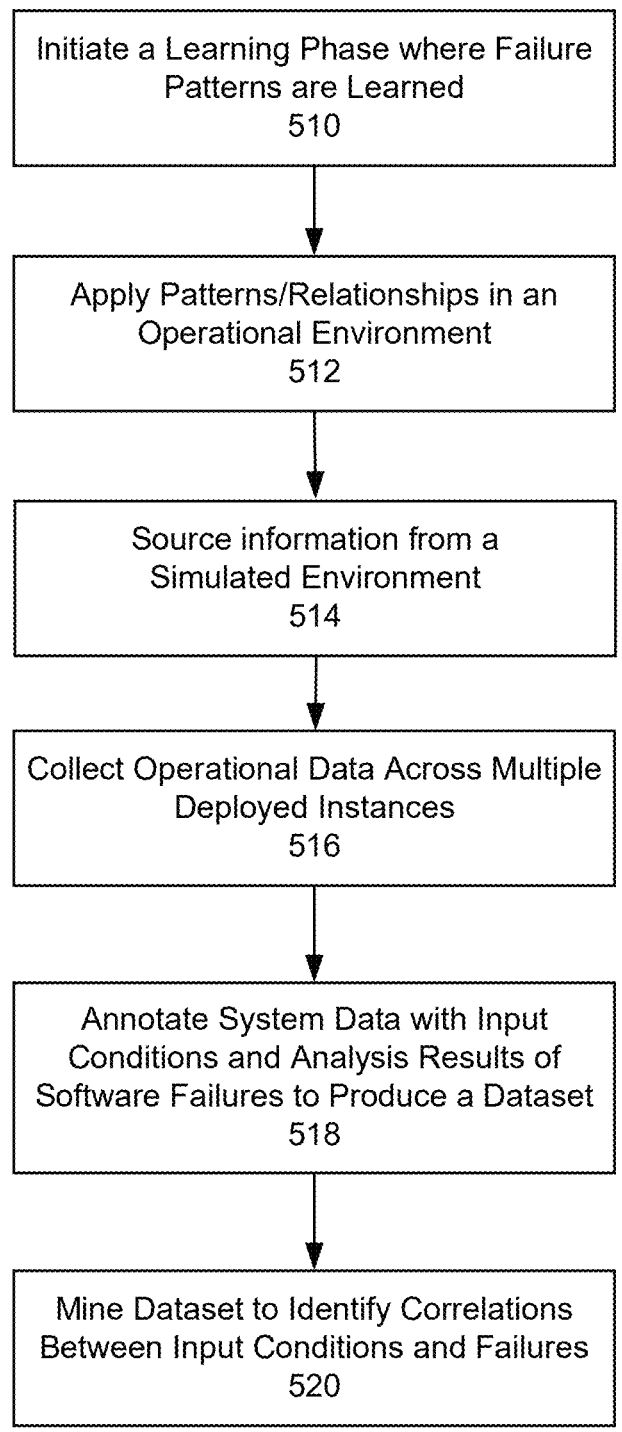
FIG. 5 is an exemplary flowchart, according to an embodiment of the present invention.

FIG. 5 is an exemplary flowchart, according to an embodiment of the present invention. As shown in FIG. 5, the ability to predict a software failure may be derived from multiple distinct phases. At step 510, a learning phase may be initiated where the failure patterns are learned and/or captured. Step 512 may exploit the patterns and relationships in an operational environment. During the learning phase, information may be sourced by exercising the system in a simulated environment, at step 514. At step 516, an edge analytics capability offers the ability to collect operational data across multiple deployed instances of a system. Step 518 may annotate the generated system data with input conditions and analysis results of software failures produces a dataset. At step 520, the dataset may be mined to identify correlations between input conditions and failures. This may be accomplished by a statistical analysis or a Machine Learning (ML) algorithm tasked to learn the target relationship. While the process of FIG. 5 illustrates certain steps performed in a particular order, it should be understood that the embodiments of the present invention may be practiced by adding one or more steps to the processes, omitting steps within the processes and/or altering the order in which one or more steps are performed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information.

Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer implemented system that implements edge analytics to predict software failures, the system comprising:
   a memory component; and
   a computer server executing in an operational environment and coupled to the memory component, the computer server comprising a computer processor configured to perform the steps of:
   monitoring the computer server during an operational execution;
   executing a prediction mechanism to anticipate a software failure wherein the prediction mechanism operates:
      a first phase that captures one or more failure patterns wherein the one or more failure patterns are sourced from a corresponding simulated environment that generates data for a relationship model that identifies one or more relationships between a first set of input conditions and test results through condition sampling and that collects operational edge analytics data across multiple deployed instances during the operational execution in the operational environment; and
      a second phase that applies the one or more failure patterns in the operational environment to identify one or more input conditions and analysis results of one or more software failures to produce a dataset, make an assessment independent of the one or more input conditions enabling one or more evaluations in an untested condition space and identify correlations between a second set of input conditions and the one or more software failures through statistical analysis wherein the relationship model from the first phase is applied to the operational environment in the second phase;
   responsive to the prediction mechanism, generating a decision boundary that provides a baseline to avoid the one or more software failures in the operational environment; and
   responsive to the anticipated software failure, generating at least one recommended course of action.

2. The system of claim 1, wherein the statistical analysis is applied through a machine learning algorithm.

3. The system of claim 1, wherein the course of action comprises automatically adapting the computer processor to avoid the decision boundary.

4. The system of claim 1, wherein the one or more software failures relates to: one or more of: an unexpected result, a developer error, a design flaw, and one or more insufficient system requirements.

5. The system of claim 1, wherein the at least one recommended course of action is automatically implemented.

6. The system of claim 1, wherein the prediction mechanism is performed prior to a system deployment.

7. The system of claim 1, wherein the prediction mechanism is performed prior to a mission execution.

8. The system of claim 1, wherein the prediction mechanism is performed during a mission execution.

9. The system of claim 1, wherein the operational edge analytics is collected through an edge analytics instrument.

10. The system of claim 1, wherein the corresponding simulated environment supports condition sampling, objective optimization and finding relationships between input conditions and test results.

11. A computer implemented method that implements edge analytics to predict software failures, the method comprising the steps of:
   monitoring a computer server coupled to a memory component during an operational execution;
   executing a prediction mechanism to anticipate a software failure wherein the prediction mechanism operates:
      a first phase that captures one or more failure patterns wherein the one or more failure patterns are sourced from a corresponding simulated environment that generates data for a relationship model that identifies one or more relationships between a first set of input conditions and test results through condition sampling and that collects operational edge analytics data across multiple deployed instances during the operational execution in an operational environment; and
      a second phase that applies the one or more failure patterns in the operational environment to identify one or more input conditions and analysis results of one or more software failures to produce a dataset, make an assessment independent of the one or more input conditions enabling one or more evaluations in an untested condition space and identify correlations between a second set of input conditions and the one or more software failures through statistical analysis wherein the relationship model from the first phase is applied to the operational environment in the second phase;
   responsive to the prediction mechanism, generating a decision boundary that provides a baseline to avoid the one or more software failures in the operational environment; and
   responsive to the anticipated software failure, generating at least one recommended course of action.

12. The method of claim 11, wherein the statistical analysis is applied through a machine learning algorithm.

13. The method of claim 11, wherein the course of action comprises automatically adapting the computer processor to avoid the decision boundary.

14. The method of claim 11, wherein the one or more software failures relates to: one or more of: an unexpected result, a developer error, a design flaw, and one or more insufficient system requirements.

15. The method of claim 11, wherein the at least one recommended course of action is automatically implemented.

16. The method of claim 11, wherein the prediction mechanism is performed prior to a system deployment.

17. The method of claim 11, wherein the prediction mechanism is performed prior to a mission execution.

18. The method of claim 11, wherein the prediction mechanism is performed during a mission execution.

19. The method of claim 11, wherein the operational edge analytics is collected through an edge analytics instrument.

20. The method of claim 11, wherein the corresponding simulated environment supports condition sampling, objective optimization and finding relationships between input conditions and test results.

* * * * *